United States Patent [19]

Harrison et al.

[11] Patent Number: 5,166,125
[45] Date of Patent: Nov. 24, 1992

[54] METHOD OF FORMING COLOR FILTER ARRAY ELEMENT WITH PATTERNABLE OVERCOAT LAYER

[75] Inventors: Daniel J. Harrison, Pittsford; Mary C. S. Oldfield, Rochester, both of N.Y.

[73] Assignee: Eastman Kodak Company, Rochester, N.Y.

[21] Appl. No.: 838,624

[22] Filed: Feb. 19, 1992

[51] Int. Cl.⁵ .................... B41M 5/035; B41M 5/76
[52] U.S. Cl. .......................... 503/227; 428/1; 428/195; 428/210; 428/412; 428/913; 428/914; 430/7; 430/200; 430/201; 430/945
[58] Field of Search ............. 8/471; 428/195, 210, 428/412, 913, 914; 430/7, 200, 201, 945; 503/227

[56] References Cited

U.S. PATENT DOCUMENTS

| | | | |
|---|---|---|---|
| 3,794,576 | 2/1974 | Watt | 503/227 |
| 3,936,557 | 2/1976 | Watt | 503/227 |
| 4,058,401 | 11/1977 | Crivello | 503/227 |
| 4,069,055 | 1/1978 | Crivello | 503/227 |
| 4,161,478 | 7/1979 | Crivello | 503/227 |
| 4,310,469 | 1/1982 | Crivello | 503/227 |
| 4,374,066 | 2/1983 | Crivello et al. | 503/227 |
| 4,442,197 | 4/1984 | Crivello et al. | 503/227 |
| 4,684,671 | 8/1987 | Tsuchiya et al. | 503/227 |
| 4,835,193 | 5/1989 | Hayase et al. | 503/227 |
| 4,874,798 | 10/1989 | Koleske et al. | 503/227 |
| 4,902,669 | 2/1990 | Matsuda et al. | 503/227 |

FOREIGN PATENT DOCUMENTS

| | | | |
|---|---|---|---|
| 828670 | 9/1975 | Belgium | 503/227 |
| 207893 | 1/1987 | European Pat. Off. | 503/227 |
| 3035807 | 4/1981 | Fed. Rep. of Germany | 503/227 |
| 58-217516 | 12/1983 | Japan | 503/227 |
| 62-021150 | 1/1987 | Japan | 503/227 |
| 2-022652 | 1/1990 | Japan | 503/227 |
| 2-107630 | 4/1990 | Japan | 503/227 |

Primary Examiner—Bruce H. Hess
Attorney, Agent, or Firm—Harold E. Cole

[57] ABSTRACT

A color filter array element, preferably for use in a color electro-optical display device such as a liquid crystal display device, comprises a support having thereon a polymeric dye image-receiving layer containing a thermally transferred image comprising a repeating pattern of colorants and a photopolymerizable overcoat layer. Areas of the overcoat layer which have not been subjected to conditions that effect polymerization of the layer are selectively removable together with the corresponding underlying areas of the image-receiving layer. In a preferred embodiment the photopolymerizable overcoat layer contains at least about 25 weight percent of 3,4-epoxycyclohexylmethyl-3,4-epoxycyclohexylcarboxylate and at least about 4 weight percent of a triarylsulfonium salt.

13 Claims, 1 Drawing Sheet

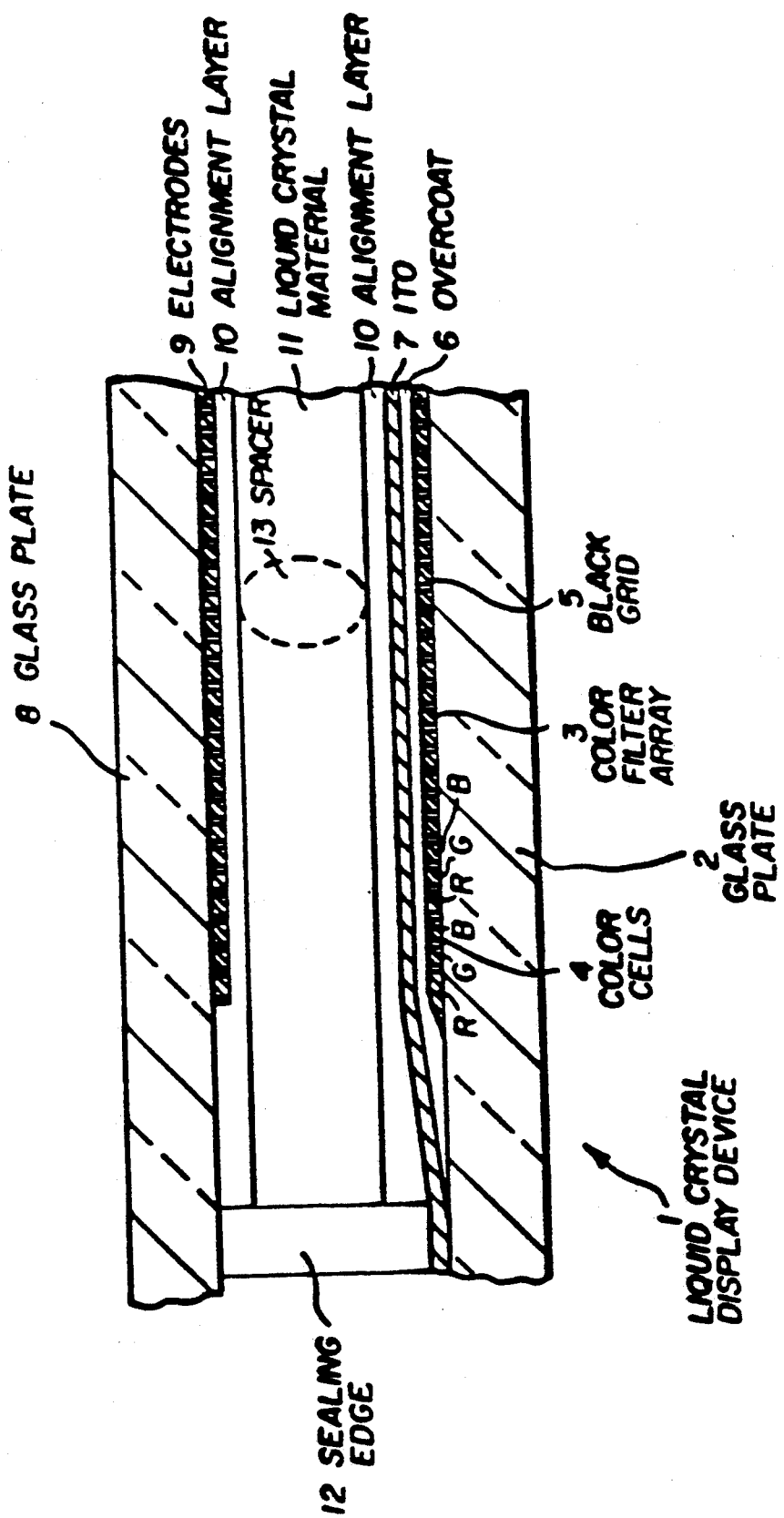

METHOD OF FORMING COLOR FILTER ARRAY ELEMENT WITH PATTERNABLE OVERCOAT LAYER

CROSS REFERENCE TO RELATED APPLICATION

Reference is made to applicants' copending application Ser. No. 07/838,620, entitled "Color Filter Array Element with Protective Overcoat Layer and Method of Forming Same," filed concurrently herewith.

FIELD OF THE INVENTION

This invention relates to a method of forming a color filter array element and, more particularly, to a method of forming a color filter array element which is overcoated with a photopolymerizable and selectively removable overcoat layer.

BACKGROUND OF THE INVENTION

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals, which are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271, the disclosure of which is hereby incorporated by reference.

Another way to obtain a thermal transfer print using the electronic signals described above is to use a laser instead of a thermal printing head. In such a system, the donor sheet includes a material that strongly absorbs at the wavelength of the laser. When the donor is irradiated, this absorbing material converts light energy to thermal energy and transfers the heat to the dye in the immediate vicinity, thereby heating the dye to its vaporization temperature for transfer to the receiver. The absorbing material may be present in a layer beneath the dye and/or it may be admixed with the dye. The laser beam is modulated by electronic signals that are representative of the shape and color of the original image, so that each dye is heated to cause volatilization only in those areas in which its presence is required on the receiver to reconstruct the color of the original object. Further details of this process are found in GB No. 2,083,726A.

Liquid crystal display devices are known for digital display in electronic calculators, clocks, household appliances, audio equipment, etc. Liquid crystal displays are being developed to replace cathode ray tube technology for display terminals. Liquid crystal displays occupy a smaller volume than cathode ray tube devices with the same screen area. In addition, liquid crystal display devices usually have lower power requirements than corresponding cathode ray tube devices.

There has been a need to incorporate a color display capability into such monochrome display devices, particularly in such applications as peripheral terminals using various kinds of equipment involving phototube display, mounted electronic display, or TV-image display. Various attempts have been made to incorporate a color display using a color filter array element into these devices. However, none of the color array elements for liquid crystal display devices so far proposed have been successful in meeting all the users' needs.

One commercially available type of color filter array element that has been used in liquid crystal display devices for color display capability is a transparent support having a gelatin layer thereon which contains dyes having the additive primary colors red, green and blue in a mosaic pattern obtained by using a photolithographic technique. To prepare such a color filter array element, a gelatin layer is sensitized, exposed to a mask for one of the colors of the mosaic pattern, developed to harden the gelatin in the exposed areas, and washed to remove the unexposed (uncrosslinked) gelatin, thus producing a pattern of gelatin which is then dyed with dye of the desired color. The element is then recoated and the above steps are repeated to obtain the other two colors. Misalignment or improper deposition of color materials may occur during any of these operations. This method therefore contains many labor-intensive steps, requires careful alignment, is time-consuming and very costly. Further details of this process are disclosed in U.S. Pat. No. 4,081,277. U.S. Pat. No. 4,786,148 also discloses a color filter array element that employs certain pigments.

Color liquid crystal display devices generally include two spaced glass panels which define a sealed cavity that is filled with a liquid crystal material. For actively-driven devices, a transparent electrode is formed on one of the glass panels, which electrode may be patterned or not, while individually addressable electrodes are formed on the other of the glass panels. Each of the individual electrodes has a surface area corresponding to the area of one picture element or pixel. If the device is to have color capability, each pixel must be aligned with a color area, e.g., red, green or blue, of a color filter array. Depending upon the image to be displayed, one or more of the pixel electrodes is energized during display operation to allow full light, no light or partial light to be transmitted through the color filter area associated with that pixel. The image perceived by a user is a blending of colors formed by the transmission of light through adjacent color filter areas.

In forming such a liquid crystal display device, the color filter array element to be used therein may have to undergo rather severe heating and treatment steps during manufacture. For example, a transparent conducting layer, such as indium tin oxide (ITO), is usually vacuum sputtered onto the color filter array element which is then cured and patterned by etching. The curing may take place at temperatures as high as 200° C. for times which may be as long as one hour or more. This is followed by coating with a thin polymeric alignment layer for the liquid crystals, such as a polyimide, followed by another curing step for up to several hours at an elevated temperature. These treatment steps can be very harmful to many color filter array elements.

Polycarbonate dye image-receiving layer materials for color filter array elements are described in U.S. Pat. No. 4,962,081. In using these materials to form a color filter array element, the polymeric material is typically coated on a glass support, using spin coating in order to obtain a smooth coating.

Processes for the manufacture of color filter arrays entail the use of high temperatures and a variety of solvents, which conditions can cause damage to the polymeric dye image-receiving layers. A photopolymerizable overcoat is useful for protecting the image-receiving layer against degradation during the multiple steps of the manufacturing process.

Liquid crystal display devices often contain several electronic chips located outside the viewing area on the support containing the color filter array. In those instances where a chip is not functioning or is improperly positioned, a repair process to remove, reposition, and/or replace the defective chip is preferable for economic reasons to discarding the whole device. The present invention provides a method for making such chip repairs, while avoiding distortion of the polymeric image-receiving layer.

BRIEF SUMMARY OF THE INVENTION

The method of forming a color filter array element in accordance with the present invention comprises: (a) imagewise heating a dye-donor element comprising a support having thereon a dye layer, this dye-donor element being in contact with a dye receiving element comprising a transparent support having thereon a polymer dye image-receiving layer; (b) transferring portions of the dye layer to the dye receiving element to form thereon a repeating mosaic pattern of dyes; (c) coating over the dye image-receiving layer a photopolymerizable overcoat layer containing a cycloaliphatic epoxide compound and, as a polymerization initiator, an onium salt of a Lewis acid; (d) selectively subjecting areas of the polymerizable overcoat layer to conditions that effect polymerization of the epoxide compound in those areas; and (e) removing those areas of the overcoat layer that have not been polymerized together with the corresponding underlying areas of the image-receiving layer by treatment with a solvent.

DETAILED DESCRIPTION OF THE INVENTION

As noted above, the dye image-receiving layer prepared in accordance with the method of the invention contains a thermally transferred image comprising a repeating pattern of colorants in the polymeric dye image-receiving layer, preferably a mosaic pattern. In a preferred embodiment, the mosaic pattern consists of a set of red, green and blue additive primaries. In another preferred embodiment, each area of primary color and each set of primary colors are separated from each other by an opaque area, e.g., black grid lines. This has been found to give improved color reproduction and reduce flare in the displayed image.

The size of the mosaic set is not critical since it depends on the viewing distance. In general, the individual pixels of the set are from about 50 to about 600 μm and do not have to be of the same size. In a preferred embodiment, the repeating mosaic pattern of dye to form the color filter array element consists of uniform, square, linear repeating areas, with one color diagonal displacement as follows:

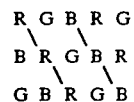

In another preferred embodiment, the above squares are approximately 100 μm.

The color filter array elements prepared according to the method of the invention can be used in image sensors or in various electro-optical devices such as electroscopic light valves or liquid crystal display devices. Such liquid crystal display devices are described, for example, in UK Patents 2,154,355; 2,130,781; 2,162,674 and 2,161,971.

Liquid crystal display devices are commonly made by placing a material, which is liquid crystalline at the operating temperature of the device, between two transparent electrodes, usually indium tin oxide coated on a substrate such as glass, and exciting the device by applying a voltage across the electrodes. Alignment layers are provided over the transparent electrode layers on both substrates and are treated to orient the liquid crystal molecules in order to introduce a twist of, e.g., 90°, between the substrates. Thus, the plane of polarization of plane polarized light will be rotated in a 90° angle as it passes through the twisted liquid crystal composition from one surface of the cell to the other surface. Application of an electric field between the selected electrodes of the cell causes the twist of the liquid crystal composition to be temporarily removed in the portion of the cell between the selected electrodes. By use of optical polarizers on each side of the cell, polarized light can be passed through the cell or extinguished, depending on whether or not an electric field is applied.

The polymeric alignment layer described above can be any of the materials commonly used in the liquid crystal art. Examples of such materials include polyimides, polyvinyl alcohol, and methyl cellulose.

The transparent conducting layer described above is also conventional in the liquid crystal art. Examples of such materials include indium tin oxide, indium oxide, tin oxide and cadmium stannate.

BRIEF DESCRIPTION OF THE DRAWINGS

The Figure shows diagrammatically a part of liquid crystal display device 1 having a plate 2 of glass, quartz, or other suitable material. A color filter array 3 comprises red (R), green (G) and blue (B) cells 4 corresponding to pixels. Black grid lines 5 separate each color cell. The color filter array 3 is provided with an overcoat layer 6 and a transparent conducting layer of ITO 7.

In the color filter array prepared by the method of the invention the overcoat layer 6 is a photopolymerizable layer containing a cycloaliphatic epoxide compound such as 3,4-epoxycyclohexylmethyl-3,4-epoxycyclohexylcarboxylate and an onium salt of a Lewis acid as a photoinitiator, as described more fully hereinafter.

The other plate 8 has electrodes 9 provided thereon which define pixels, either because the electrodes 9 and the transparent conducting layer of ITO 7 constitute a cross-bar system in which the crossings define the pixels (passive drive), or because the electrodes 9 constitute picture electrodes which are driven by a system (not shown) of switching elements, drive and data lines (active drive), in which case the electrodes 9 may have a single flat structure.

A layer of liquid crystal material 11, which is provided with alignment layers 10, is present between the two supporting plates 2 and 8. The two plates are held at a substantially constant distance from each other by means of a sealing edge 12 and spacers 13. In practice, the device is further provided with polarizers, reflectors, etc. in the conventional manner.

In a liquid crystal display device, the electronic chips or other electronic hardware located on the plate containing the color filter array are connected via the transparent ITO layer, which has been etched to form a pattern of leads outside the viewing area. If a chip is not functioning or is improperly positioned, it is preferable to remove, reposition, and/or replace the defective chip rather than discard the entire device. It is essential, however, that the chip repair process not cause any distortion of the polymeric image-receiving layer because such distortion could result in the breakage of current-carrying leads and failure of one or more sections of the display.

Chip repair can be accomplished without distortion of the image-receiving layer in accordance with the method of the invention by exposing the color filter array element that contains the photopolymerizable overcoat 6 to ultraviolet radiation through a mask of the desired pattern, then removing those masked areas of the overcoat that have not been polymerized together with the corresponding underlying areas of the image-receiving layer. Thus, for example, that area of the overcoat which lies within the viewing area of the liquid crystal display device can be irradiated to effect polymerization to form a protective coat over the transferred dye image in the image-receiving layer, and areas of the overcoat that lie outside the viewing area can be masked from irradiation. This enables selective removal of the unexposed, unpolymerized areas of the overcoat layer and the corresponding underlying areas of the image-receiving layer and allows repair or removal of defective chips.

The dye image-receiving layer used in forming the color filter array element in the method of the invention comprises polymers that are soluble in organic solvents such as cyclohexanone, for example, those polymers described in U.S. Pat. Nos. 4,695,286, 4,740,797 and 4,775,657, and 4,962,081, the disclosures of which are hereby incorporated by reference. In a preferred embodiment, polycarbonates having a glass transition temperature greater than about 200° C. are employed. In another preferred embodiment, polycarbonates derived from a methylenesubstituted bisphenol A such as 4,4'-(hexahydro-4,7-methanoindan-5-ylidene)-bisphenol are employed. In general, good results have been obtained at a coverage of from about 0.25 to about 5 mg/m$^2$.

The support used in the method of the invention is preferably glass such as borax glass, borosilicate glass, chromium glass, crown glass, flint glass, lime glass, potash glass, silica-flint glass, soda glass, and zinc-crown glass. In a preferred embodiment, borosilicate glass is employed.

A dye-donor element that is used to form the color filter array element in accordance with the method of the invention comprises a support having thereon a dye layer. Any dye or mixture of dyes can be used in such a layer provided they are transferable to the dye image-receiving layer of the color array element by the action of heat. Especially good results have been obtained with sublimable dyes. Examples of sublimable dyes include anthraquinone dyes, e.g., Sumikalon Violet RS ®️ (Sumitomo Chemical Co., Ltd.), Dianix Fast Violet 3R-FS ®️ (Mitsubishi Chemical Industries, Ltd.), and Kayalon Polyol Brilliant Blue N-BGM ®️ and KST Black 146 ®️ (Nippon Kayaku Co., Ltd.); azo dyes such as Kayalon Polyol Brilliant Blue BM ®️, Kayalon Polyol Dark Blue 2BM ®️, and KST Black KR ®️ (Nippon Kayaku Co., Ltd.), Sumickaron Diazo Black 5G ®️ (Sumitomo Chemical Co., Ltd.), and Miktazol Black 5GH ®️ (Mitsui Toatsu Chemicals, Inc.); direct dyes such as Direct Dark Green B ®️ (Mitsubishi Chemical Industries, Ltd.) and Direct Brown M ®️ and Direct Fast Black D ®️ (Nippon Kayaku Co. Ltd.); acid dyes such as Kayanol Milling Cyanine 5R ®️ (Nippon Kayaku Co. Ltd.); basic dyes such as Sumicacryl Blue 6G ®️ (Sumitomo Chemical Co., Ltd.), and Aizen Malachite Green ®️ (Hodogaya Chemical Co., Ltd.); or any of the dyes disclosed in U.S. Pat. Nos. 4,541,830, 4,698,651, 4,695,287, 4,701,439, 4,757,046, 4,743,582, 4,769,360 and 4,753,922, the disclosures of which are hereby incorporated by reference.

Suitable dyes are further/illustrated by the following structural formulas:

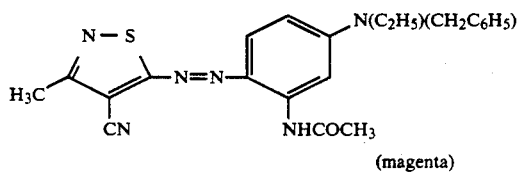

(magenta)

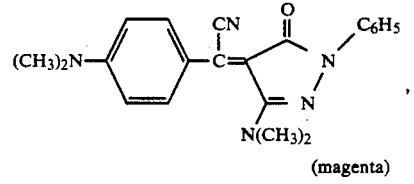

(magenta)

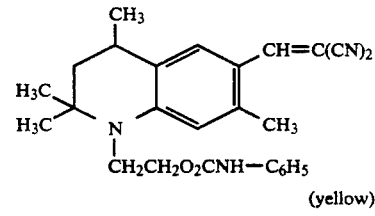

(yellow)

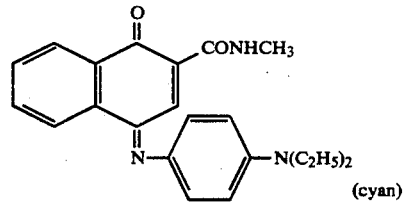

(cyan)

The above subtractive dyes can be employed in various combinations to obtain the desired red, blue and green additive primary colors, as disclosed in U.S. Pat. Nos. 4,957,898, 4,975,410, and 4,988,665, the disclosures of which are hereby incorporated by reference. The dyes can be mixed within the dye layer or transferred sequentially if coated in separate dye layers. The dyes can be used at a coverage of from about 0.05 to about 1 g/m$^2$.

Various methods can be used to transfer dye from the dye donor to the image-receiving layer on the support to form the color filter array element in accordance with the method of the invention. For example, a high intensity light flash technique can be used with a dye-donor containing an energy absorptive material such as carbon black or a light-absorbing dye. Such a donor can be used in conjunction with a mirror which has a grid pattern formed by etching with a photoresist material. This method is described more fully in U.S. Pat. No. 4,923,860.

Another method of transferring dye from the dye-donor to the transparent support to form the color filter array element in accordance with the method of the invention is to use a heated embossed roller, as described more fully in U.S. Pat. No. 4,978,652, incorporated herein by reference.

In another embodiment of the method of the invention, the imagewise-heating is done by means of a laser, using a dye-donor element comprising a support having thereon a dye layer and an absorbing material for the laser. Whichever of these known thermal transfer dye methods is selected for making the color filter array element according to the method of the invention, the imagewise heating causes the dyes to transfer and form a repeating mosaic pattern of colorants in the receiving layer.

Any material that absorbs the laser energy or high intensity light flash described above can be used as the absorbing material, for example, carbon black or non-volatile infrared-absorbing dyes or pigments which are well known to those skilled in the art. In a preferred embodiment, cyanine infrared absorbing dyes are employed as described in U.S. Pat. No. 4,973,572, the disclosure of which is hereby incorporated by reference.

After the dyes are transferred to the receiver, the image can be treated to further diffuse the dye into the dye-receiving layer in order to stabilize the image. This can be done by radiant heating, solvent vapor, or by contact with heated rollers. The fusing step aids in preventing fading and surface abrasion of the image upon exposure to light and also tends to prevent crystallization of the dyes. Solvent vapor fusing may also be used instead of thermal fusing.

After the color filter array has been prepared by transfer of the dyes to the image-receiving layer, a photopolymerizable overcoat is applied, using a formulation that contains a cycloaliphatic epoxide compound such as 3,4-epoxycyclohexylmethyl-3,4-epoxycyclohexylcarboxylate and a photoinitiator, which preferably is an onium salt of a Lewis acid, for example, a triarylsulfonium salt. The overcoat formulation preferably contains at least about 25 weight percent of the cycloaliphatic epoxide compound and at least about 4 weight percent of the photoinitiator.

Especially useful photoinitiators in accordance with the method of the invention include Cyracure UVI-6974 ® triarylsulfonium hexafluoroantimonate and Cyracure UVI-6990 ® triarylsulfonium hexafluorophosphate, both products of Union Carbide Company. Other useful photoinitiators are disclosed in U.S. Pat. Nos. 4,161,478, 4,374,066, and 4,684,671, the disclosures of which are herein incorporated by reference.

In addition to the epoxide compound and the photoinitiator, the overcoat layer can contain additional solvents and diluents such as ethers, for example, 1,4-butanediol diglycidyl ether, bisphenol A diglycidyl ether, and the like.

In accordance with the method of the invention, after the photopolymerizable overcoat has been applied, the color filter array element is exposed to ultraviolet radiation through a mask of the desired pattern. The irradiated color filter array element is then subjected to a further step of heating to accelerate polymerization. The sample is then patterned by dissolving in a single step both the unexposed overcoat layer and the underlying areas of the dye image-receiving layer with a suitable organic solvent such as cyclohexanone. In areas where the overcoat layer has been polymerized by irradiation, the hardened overcoat and the underlying areas of the image-receiving layer are resistant to attack by the solvent.

A series of overcoated elements which demonstrate the removability of aliphatic cycloepoxide compound overcoats as used in the method of the invention have been prepared and tested. A series of controls have also been made and tested, all as described below.

GENERAL PROCEDURE FOR FORMING THE OVERCOATED ELEMENTS

Color filter array model samples were prepared by first spin coating a 0.1% solution of VM651 ® siloxane adhesion promoter (a product of Dupont) in a mixture of 95% methanol and 5% distilled water onto a piece of clean glass for 2 minutes at 1000 rpm. The adhesion promoting layer had a thickness of less than 0.1 $\mu$m. Next, a 12% solution of the receiver polymer 4,4'-(hexahydro-4,7-methanoindan-5-ylidene) bisphenol polycarbonate in cyclohexanone was spin coated over the adhesion promoting layer by spinning for 2 minutes at 1000 rpm. The dye receiving layer had a thickness of ~3.5 um. The coated samples were then heated in an oven for one hour at 90° C.

In the specific examples described below, for simplicity no dye image was transferred to the image-receiving layer because the presence of dye was not required to demonstrate the invention. In limited testing a dye was transferred to the image-receiving layer; the test results from samples containing dye and those not containing dye were equivalent.

A UV-curable overcoat was applied to the polymeric image-receiving layer by spin coating a solution of cycloaliphatic epoxide compound and photoinitiator composition, as employed in the elements of the invention, for 2 minutes at 4300 rpm, which produced a layer of 3.3 $\mu$m thickness. For thicker overcoat layers, the spin coating was carried out at 1000 rpm.

Unless otherwise stated in the examples and controls hereinafter, all of the formulations of the photopolymerizable overcoat layer contained Cyracure UVR-6110 ® 3,4-epoxycyclohexylmethyl-3,4-epoxycyclohexylcarboxylate and, as photoinitiators, Cyracure UVI-6974 ® triarylsulfonium hexafluoroantimonate or Cyracure UVI-6990 ® triarylsulfonium hexafluorophosphate; these materials are products of Union Carbide Co.

TESTING PROCEDURE

The overcoated samples were exposed to ultraviolet radiation for 5 minutes from a Model M-218 exposing unit (from Colight Inc.; this unit has a medium pressure mercury lamp whose major wavelengths are 366 nm and 405 nm) through a mask which has an opaque border surrounding a 5.2 cm-square clear center area. In some cases the samples were exposed to a longer period of radiation. After exposure the samples were heated in an oven for 15 minutes at 60° C.

Following exposure to ultraviolet radiation through the mask, the samples were placed on a spin coater for 2 minutes and washed with cyclohexanone for 10–60 seconds. Where photopolymerization of the overcoat layer had occurred, a border of the hardened overcoat and the underlying area of the image-receiving layer remained on the glass plate. Where photopolymerization of the overcoat had not occurred, the coatings were quickly and entirely washed off the plate.

EXAMPLE 1

A solution of 96% by weight 3,4-epoxycyclohexylmethyl-3,4-epoxycyclohexylcarboxylate and 4% by weight triarylsulfonium hexafluoroantimonate was spin coated on the image-receiving layer, giving an overcoat layer of 3.3 $\mu$m thickness. After 5 minutes exposure to ultraviolet radiation and 15 minutes heating at 60° C., the sample was washed with cyclohexanone. A border of hardened overcoat remained on the glass plate, demonstrating the selective removal of coatings from the patterned sample.

EXAMPLE 2

The procedure of Example 1 was followed, except that the spin coating speed was adjusted to give an overcoat thickness of 18.8 $\mu$m. After exposure and washing of the sample, a hardened overcoat border remained on the plate, demonstrating the selective removal of coatings from the patterned sample.

EXAMPLE 3

The procedure of Example 1 was followed, except that the solution contained 90% by weight of the cycloaliphatic epoxide compound and 10% by weight of the photoinitiator. After exposure and washing, a hardened overcoat border remained on the plate, demonstrating the selective removal of coatings from the patterned sample.

EXAMPLE 4

The procedure of Example 1 was followed, except that the solution contained 80% by weight of the cycloaliphatic epoxide compound and 20% by weight of the photoinitiator. After exposure and washing, a hardened overcoat border remained on the plate, demonstrating the selective removal of coatings from the patterned sample.

EXAMPLE 5

The procedure of Example 1 was followed, except that the solution contained 71% by weight of the cycloaliphatic compound, 4% by weight of the photoinitiator, and 25% by weight of Araldite GY6010® bisphenol A diglycidyl ether (from Ciba-Geigy). After exposure and washing, a border of hardened overcoat layer remained on the plate, demonstrating the selective removal of coatings from the patterned sample containing 71% of the cycloaliphatic compound. A related test with an overcoat formulation containing only 25% by weight of the cycloaliphatic epoxide compound demonstrated that the overcoat layer could be hardened enough to be patterned even at that low epoxide level.

EXAMPLE 6

The procedure of Example 1 was followed, except that the solution contained 90% by weight of the cycloaliphatic epoxide compound and 10% by weight of triarylsulfonium hexafluorophosphate. After exposure and washing, a border remained on the plate, demonstrating the selective removal of coatings from the patterned sample.

EXAMPLE 7

The procedure of Example 1 was followed, except that the solution contained 80% by weight of the cycloaliphatic epoxide compound and 20% by weight of triarylsulfonium hexafluorophosphate, and the spin coating speed was adjusted to give an overcoat thickness of 37 $\mu$m. After exposure and washing, a border remained on the plate, demonstrating the selective removal of coatings from the patterned sample.

CONTROL A

The procedure of Example 1 was followed, except that the solution contained 99% by weight of the cycloaliphatic epoxide compound and 1% by weight of the photoinitiator. After exposure and washing, no border remained on the glass plate. Apparently the level of photoinitiator was insufficient to cause hardening of the overcoat layer during the 5-minute irradiation period.

CONTROL B

The procedure of Example 1 was followed, except that the solution contained 99% by weight of the cycloaliphatic epoxide compound and 1% by weight of triarylsulfonium hexafluorophosphate. After exposure and washing, no border remained on the plate. Apparently the level of photoinitiator was insufficient to cause hardening of the overcoat layer during the irradiation period.

CONTROL C

The procedure of Example 1 was followed, except that the solution contained 96% by weight of the cycloaliphatic epoxide compound and 4% by weight of triarylsulfonium hexafluorophosphate. After exposure and washing, no border remained on the plate. Apparently the level of photoinitiator was insufficient to cause hardening of the overcoat during the irradiation period.

CONTROL D

The procedure of Example 1 was followed, except that the solution contained 99% by weight of the cycloaliphatic epoxide compound and 1% by weight of triphenylsulfonium hexafluoroarsenate (from Johnson-Massey Alpha Products). After exposure and washing, no border remained on the plate. Apparently the level of photoinitiator was insufficient to cause hardening of the overcoat during the irradiation period.

Formulations of cycloaliphatic epoxide compound and triphenylsulfonium hexafluoroarsenate in which the level of the latter material was raised successively to 4%, 10%, and 20% by weight were also coated on the image receiving layer. After 5 minutes irradiation and subsequent washing, no border remained on the plate. In subsequent tests, samples overcoated with the formulation of 80% by weight of cycloaliphatic epoxide and 20% by weight of triphenylsulfonium hexafluoroarsenate were irradiated for periods of 30 and 60 minutes before washing. Even after these lengthy periods of irradiation, no border remained on the plate. Apparently triphenylsulfonium hexafluoroarsenate was too unreactive at practical levels and exposure times to promote hardening of the overcoat layer.

The results obtained in the preceding examples demonstrate that, in accordance with the method of the invention, a photopolymerizable overcoat layer that contains a cycloaliphatic epoxide compound and at least about 4% by weight of a photoinitiator can enable selective removal of areas of the overcoat layer together with the corresponding underlying areas of the image-receiving layer.

The invention has been described in detail with particular reference to preferred embodiments thereof, but it will be understood that variations and modifications can be effected within the spirit and scope of the invention.

We claim:

1. A method of forming a color filter array element which comprises:
   (a) imagewise heating a dye-donor element comprising a support having thereon a dye layer, said donor element being in contact with a dye receiving element comprising a transparent support having thereon a polymeric dye image-receiving layer, and thereby
   (b) transferring portions of said dye layer to said dye receiving element to form a repeating mosaic pattern of dyes thereon, and
   (c) coating over said dye image-receiving layer a photopolymerizable overcoat layer containing a cycloaliphatic epoxide compound and, as a polymerization initiator, an onium salt of a Lewis acid,
   (d) selectively subjecting areas of said photopolymerizable overcoat layer to conditions that effect polymerization of said epoxide compound in said areas, and
   (e) removing areas of said overcoat layer that have not been polymerized together with the corresponding underlying areas of said image-receiving layer by treatment with a solvent.

2. The method of claim 1 wherein said element is adapted for use in a color electro-optical display device.

3. The method of claim 2 wherein selected areas of each overcoat layer are masked, the element is exposed to ultraviolet radiation, and thereafter the unpolymerized overcoat in such masked areas and the corresponding underlying areas of the dye image-receiving layer are removed by treatment with a solvent to permit repair of electronic chips underlying the overcoat in said masked areas.

4. The method of claim 3 wherein said overcoat layer contains at least about 25 weight percent of said cycloaliphatic epoxide compound and at least about 4 weight percent of said initiator.

5. The method of claim 3 wherein said cycloaliphatic epoxide compound is 3,4-epoxycyclohexylmethyl-3,4-epoxycyclohexylcarboxylate.

6. The method of claim 3 wherein said polymeric dye image-receiving layer is a polycarbonate having a glass transition temperature greater than about 200° C.

7. The method of claim 6 wherein said polycarbonate is derived from 4,4'-hexahydro-4,7-methanoindan-5-ylidene)bisphenol.

8. The method of claim 3 wherein said onium salt is a triarylsulfonium hexafluoroantimonate and its concentration is at least about 4 weight percent.

9. The method of claim 3 wherein said onium salt is a triarylsulfonium hexafluorophosphate and its concentration is at least 10 weight percent.

10. The method of claim 3 wherein said solvent is cyclohexanone.

11. The method of claim 3 wherein said overcoat layer contains a diluent.

12. The method of claim 11 wherein said diluent is bisphenol A diglycidyl ether.

13. The method of claim 3 wherein said support is glass.

* * * * *